United States Patent Office 2,958,616
Patented Nov. 1, 1960

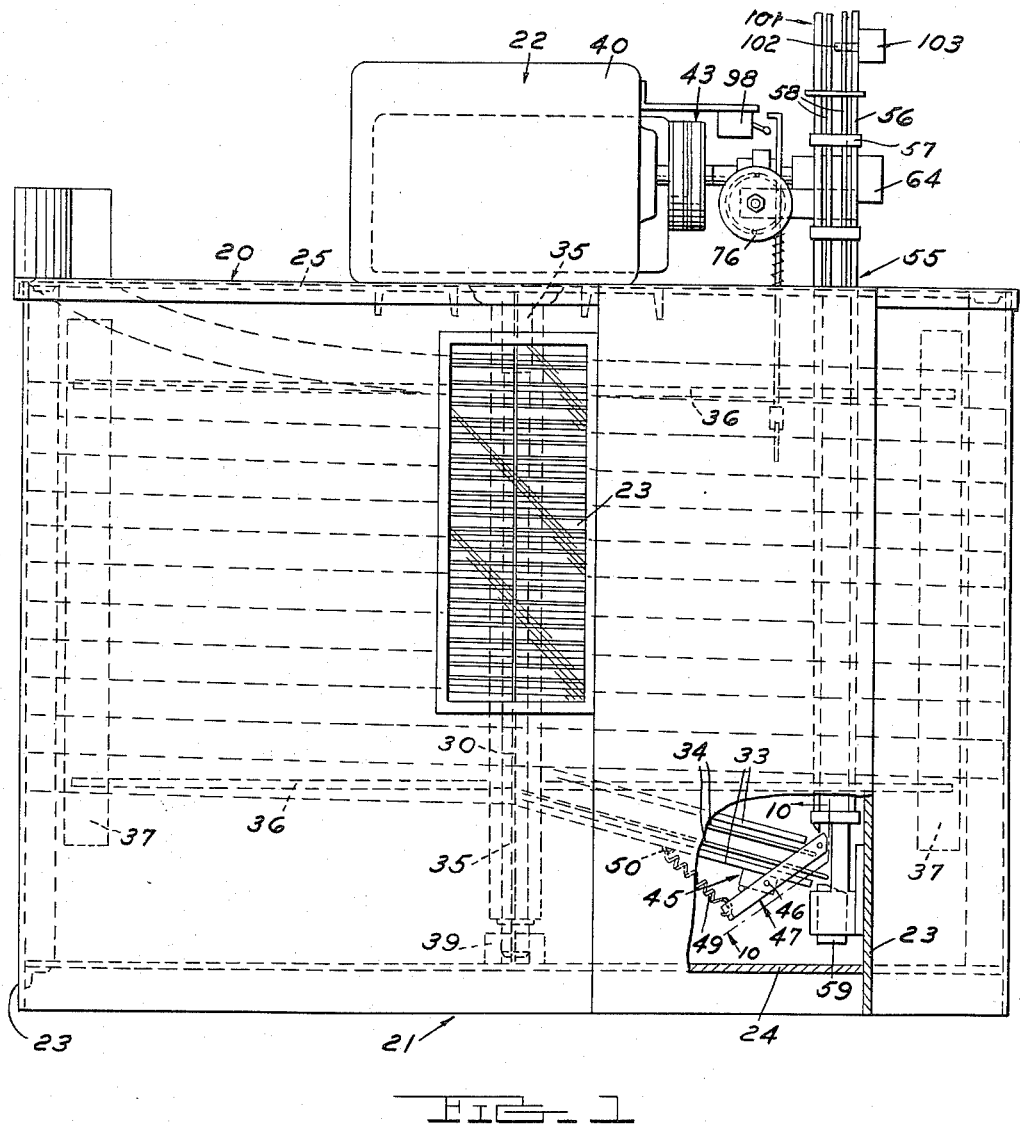

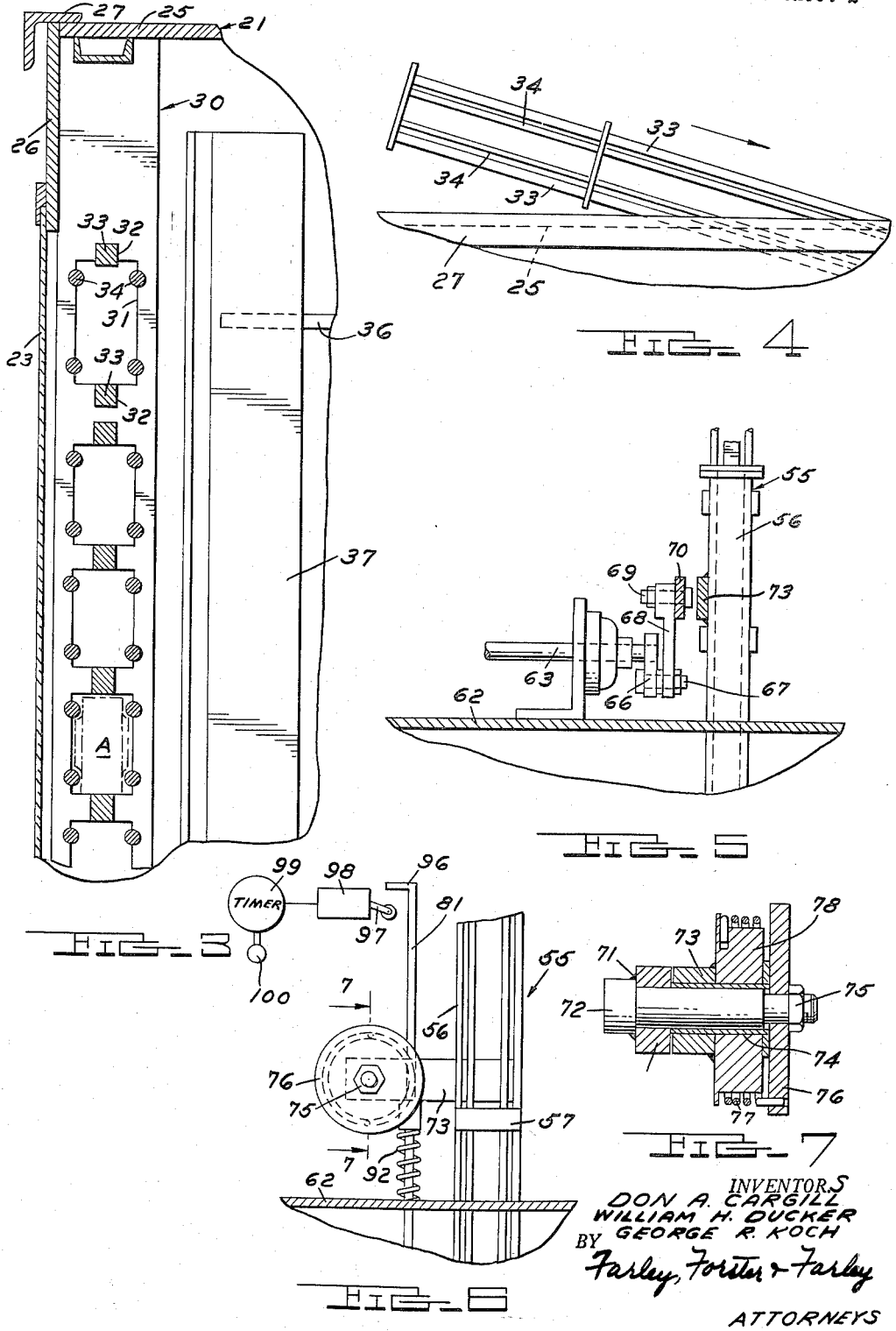

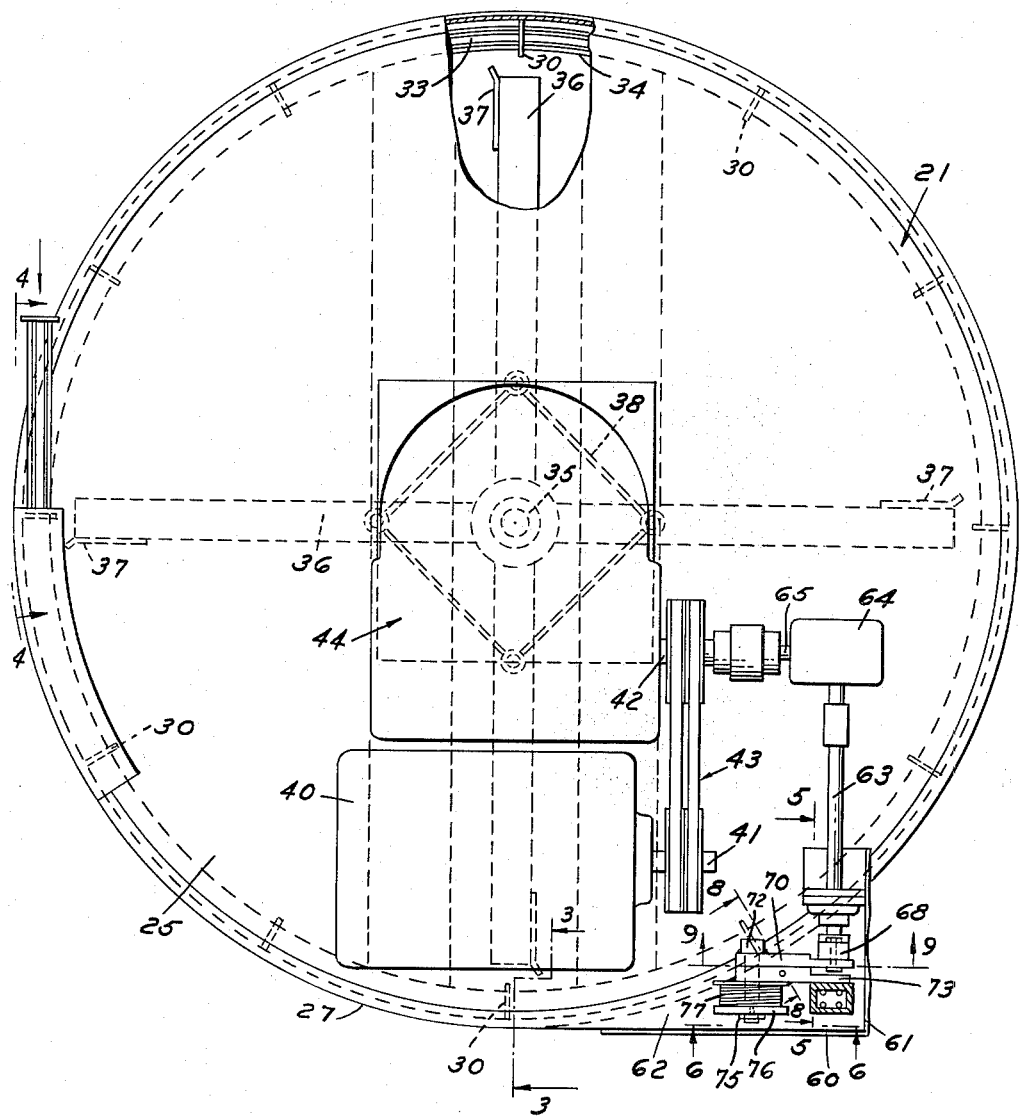

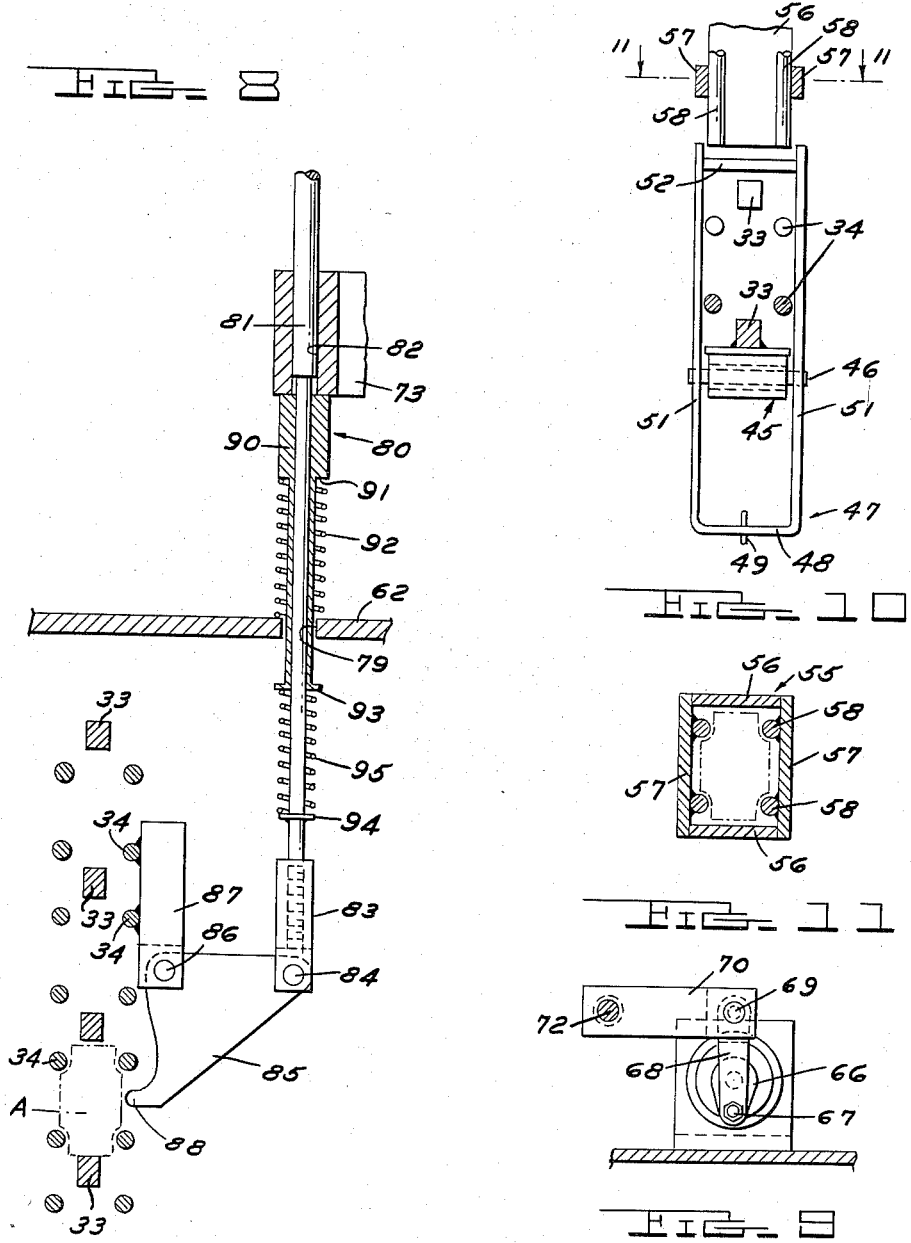

2,958,616

HANDLING METHOD AND SYSTEM FOR FRAGILE PARTS

Don A. Cargill, Birmingham, William H. Ducker, Oak Park, and George R. Koch, Detroit, Mich., assignors to Cargill Detroit Corporation, Birmingham, Mich., a corporation of Michigan Filed June 26, 1956, Ser. No. 593,911

5 Claims. (Cl. 134—25)

The present invention relates to a handling system for fragile parts and more particularly to a method of and apparatus for the storage and conveying of fragile parts.

In the manufacture of fragile parts, grave problems arise in connection with the handling and the storage of the parts during the manufacturing process. For example, in the manufacture of highly machined parts, such as transmission gears or the like, it is highly desirable to perform machining operations upon the part prior to hardening of the part. However, the unhardened parts must be handled quite carefully and are "fragile" in the sense that the parts cannot be handled by ordinary material handling apparatus, since the mere bumping of the parts together upon a conveyer or the like would cause nicking, surface tearing, or other defects in the highly finished surface of the part, which defects become magnified during heat treating to such an extent that the part is rendered unsuitable for use and becomes scrap material.

The present invention, which may be adapted to the storing and handling of many different types of parts, provides a new and novel approach to the problem of storing and handling such fragile parts. Generally, the present invention proposes the introduction of the part into a spiral storage track, the part being introduced at one end of the track and being removed from the other end of the track, the spiral track configuration accommodating the storage of a large number of parts between different manufacturing processes. In order to prevent bumping of the parts against one another or the forcible abutment of the parts with a stop mechanism or the like, the spiral track is disposed in a body of liquid, the viscosity of the liquid providing such resistance to movement of the articles that the articles are slowed appreciably by the liquid prior to their abutment with another part. In this manner, the parts may be moved along the spiral track in abutment, thereby accommodating the storage and handling of a large number of parts within a restricted track length, while at the same time the parts are not allowed to forcibly abut one another during their introduction into the track or during their travel along the track.

The liquid into which the part is introduced also serves as the actuating medium for the handling system, inasmuch as the liquid is circulated in the direction of travel of the parts along the track with the liquid being circulated by suitable rotor or pump means and serving to force the parts in the desired direction along the track. In addition, the circulation of the liquid in contact with the parts effects cleaning and lubricating of the parts.

To remove parts from the track, a novel reciprocating dispensing apparatus is utilized which in effect pumps the parts in column from the track exit to the next manufacturing process station.

It is, therefore, an important object of the present invention to provide a new and novel handling system for fragile parts.

Another important object of this invention is the provision of an improved method and apparatus for the storage and conveying of fragile parts by the introduction of the parts into a liquid medium to prevent forcible contact between adjacent parts and between the parts and the handling mechanism.

There is still a further important object to provide an improved storage and handling mechanism for fragile parts wherein the parts are introduced into a body of liquid, the viscosity of which reduces the inertial force of the part, so as to prevent damage to the part, and the liquid serving as the conveying medium for progressively advancing the part through the mechanism.

Yet another object of the present invention is the provision of a method for the storage and conveying of fragile parts whereby the parts are introduced into a body of liquid, the liquid being utilized to reduce the velocity of part travel, the liquid is circulated to advance the parts through the body of liquid, and parts are dispensed from the body of liquid.

It is still a further object of the present invention to provide an improved handling apparatus and method wherein parts are introduced by gravity into a liquid within a container provided with a spiral peripheral track, liquid within the container is circulated so as to advance parts along the track, and pump means are utilized for ejecting parts from the track.

Other and further objects will be more apparent from the following detailed description of a preferred embodiment of my invention and by reference to the drawings forming a part hereof wherein:

On the drawings:

Figure 1 is an elevational view illustrating the fragile parts handling system of the present invention, with parts broken away for clarity of illustration;

Figure 2 is a plan view of the system of Figure 1, with parts broken away and in section;

Figure 3 is a fragmentary sectional view taken along the planes 3—3 of Figure 2;

Figure 4 is a fragmentary elevational view taken along the plane 4—4 of Figure 2;

Figure 5 is a fragmentary sectional view taken along the plane 5—5 of Figure 2;

Figure 6 is a fragmentary sectional view taken along the plane 6—6 of Figure 2;

Figure 7 is an enlarged sectional view taken along the plane 7—7 of Figure 6;

Figure 8 is an enlarged fragmentary sectional view taken along the plane 8—8 of Figure 2;

Figure 9 is a fragmentary sectional view taken along the plane 9—9 of Figure 2;

Figure 10 is an enlarged fragmentary sectional view taken along the planes 10—10 of Figure 1; and Figure 11 is a sectional view taken along the plane 11—11 of Figure 10.

As shown on the drawings:

In Figure 1, reference numeral 20 refers generally to a fragile part handling system of the present invention and comprising a tank or container indicated generally at 21 surmounted by an actuating mechanism indicated generally at 22.

The tank or container 21 is liquid tight and comprises a generally cylindrical side wall 23 closed at its lower end by a floor or bottom wall 24 and at its upper end by a cover plate 25. As best illustrated, the side wall 23 is provided with a reinforced upper annular edge 26 surmounting the side wall. The removable top 25 is generally circular in shape and is encompassed by a reinforcing peripheral angle iron edge 27.

Secured to the annular reinforcement 26 and depending therefrom into the interior of the tank or container defined by the side wall 23 are a plurality of circumferentially spaced, radially inwardly projecting track-defining strips, indicated generally at 30 (Figure 3). The strips 30 are provided with vertically spaced, generally rectangular apertures 31 having their vertical edges recessed or notched, as at 32, to receive therein track-defining guide elements 33, preferably of rectangular contour. The adjacent strips 30 are each provided with a series of the vertically aligned apertures 31, and the apertures of adjacent strips are vertically offset with respect to the apertures of the next adjacent strip, so that the track-defining elements 33, which are continuous and bridge the adjacent strips 30, define a spiral path. Additional parts guide elements are provided by rods 34, preferably of circular cross-section, which are recessed into the vertically extending, lateral edges of the apertures 31.

In the specific embodiment of the invention illustrated in the drawings, the system is utilized for the handling of gear blanks which have been hobbed and formed to substantially their external contour and dimensions, and one such blank is illustrated in Figure 3, as indicated by reference character A. It will be seen that the track-defining elements 33 and the guide rods 34 cooperate to define a channel or track which closely approximate the exterior contour of the part A, so that the part is guided down the spiral track. Also, it will be noted that at the lower reaches of the container or tank 21, the guide elements 33 are common to a pair of apertures 31 so that the upper surface of each track element 33 engages the lower portion of a part A while the lower edge of the same track element 33 forms the upper guide surface for the next adjacent track convolution.

As best illustrated in Figures 1 and 2, an actuating shaft 35 projects axially into the container or tank 21, this shaft 35 serving as a rotor shaft and having secured thereto a plurality of rotor arms 36 carrying at their outer extremities vertically extending, generally rectangular rotor blades 37. The rotor arms 36 are joined by cross braces 38, and the shaft 35 is journaled for rotation in a sealed lower shaft bearing 39 carried by the floor plate 24 of the container. The shaft 35 is rotated by the actuating mechanism 22, including a suitable source of power, such as a motor 40 and a drive shaft 41 which drives a rotor drive shaft 42 by suitable means, as by a V-belt and pulley arrangement indicated generally at 43. The shaft 42 actually drives a speed changer, indicated generally at 44, which interconnects the rotor shaft 42 and the vertical actuating shaft 35.

To provide ingress into the track defined by the elements 33 and 34, these elements are extended vertically and laterally upwardly through the cover plate 25, as best illustrated in Figure 4. The inclined inlet thus defined by the exposed elements 33 and 34 is adapted to receive parts from the next preceding manufacturing process.

To provide egress from the interior of the container or tank 21, the elements 33 and 34 are extended from the last convolution of the spiral track to terminate in a downwardly and outwardly directed end portion best illustrated in the Figure 1 of the drawings. Secured to one of the elements 33 and underlying the same is a journal block, indicated generally at 45 (Figures 1 and 10), carrying a pivot pin 46 upon which is disposed a generally U-shape pump strap, indicated generally at 47, the bight section 48 of the strap 47 being connected to a tension spring 49 which has its other end fixed to the lower track element 33, as at 50. The legs 51 of the pump strap 47 receive the pivot pin 46 to support the strap for pivoted movement relative to the track, and the free outer ends of the legs 51 are joined by a laterally extending pump rod 52.

As best illustrated in Figures 1 and 11, the free outer ends of the legs 51 and the rod 52 extend into an opening formed in a vertically extending exit passage or pump column, indicated generally at 55, and comprising a pair of side plates 56 joined at vertically spaced locations by a pair of additional side plates 57 which serve to support vertically extending guide rods 58. The rods 58, in combination with the plates 56, form a channel of substantially the same size and overall contour as the spiral guide channel within the container, with the exception that the exit guide 55 extends vertically. The lower extremity of the guide channel 55 is closed by a block 59 against which a part A will rest after it has completed its travel along the spiral path defined by the track at the interior periphery of the tank or container.

As illustrated in Figure 2, a radially extending housing portion is defined by side plates 60 and 61 and a cover plate 62 and a floor plate (not shown) to accommodate the exit of the part and to place the vertically extending channel 55 outside the radial extent of the primary container track, so as not to interfere with the flow of parts therealong.

The exit channel 55 is vertically reciprocable through a driving mechanism including a pump drive shaft 63 driven through a speed changer 64 from a shaft 65 which in turn is driven by the V belt and pulley assembly 43 from the motor 40. The shaft 63 carries thereon a shaft crank 66 which is joined by a driving pin 67 to a drive crank 68 (Figure 5). The drive crank 68 is pinned, as at 69, to a lateral extending drive link 70 having its other end welded, as at 71, to a stub shaft 72, upon which is loosely journaled a pump link 73. The drive link 71 and the integral stub shaft 72 are fixedly secured, as through a press fit bushing 74 and a nut 75, to a washer 76. The washer 76 is apertured to receive one end of a torsion-type over-ride spring 77, the other end of the spring being secured to a spring block 78 welded to, or otherwise formed integrally with, pump link 73.

As best shown in Figures 2 and 5, the pump link 73 is welded or otherwise secured to the side plates 56 of the pump column or vertical channel guide 55 heretofore described. It will be appreciated that the driving of the shaft 63 will, through the shaft crank 66 and the drive crank 68, effect vertical reciprocation of the drive link 70 and the pump link 73.

The spring 77 effects an over-riding connection between the pump column 55 and the drive mechanism so that the drive may continue if, for any reason, reciprocation of the pump column is halted. In other words, the drive link 70 and the pump link 73 are ordinarily co-reciprocable, but upon undue resistance to movement of the pump link 73, the spring 77 will accommodate reciprocation of the drive link 70 without causing corresponding reciprocation of the pump link 73.

As heretofore described, the container space 21 defined by the casing 21 is liquid tight and is preferably filled with a liquid which, because of its viscosity, will reduce the inertia of a part introduced thereinto along the inlet or entry-way illustrated in Figure 4 and projecting above the container proper. Of course, the part must travel through an appreciable distance before its inertia is completely dissipated so that it may safely contact the next previous part without harmful or forcible contact therebetween.

To insure the presence of a body of liquid of such depth as to dissipate substantially completely the inertial force of a part, a part level control is utilized as best illustrated in Figure 8 of the drawings. The cover plate 62 through which the pump column 55 depends is provided with an additional aperture 79 through which the level control, indicated generally at 80, depends. This level control comprises a vertically extending actuating rod 81 which projects through a vertical aperture 82 formed in the pump link 73, the lower end of the level control rod 81 being threadly retained by suitable bracket 83 having its lower end pivotally connected, as by pin 84, to a pivot plate 85 which is also pivoted, as at 86, to a fixed bracket 87 welded, or otherwise fixedly secured, to a pair of guide rods 34 heretofore described and located below the level of the container top 25 and within the interior of the container. The pivot plate 85 is provided with a probe or finger 88 which is adapted to be inserted between a pair of the guide rods 34 for contact with a part, indicated in dotted outline at "A," if such a part happens to be in the spiral conveyor track at a level corresponding with that of finger 88.

The vertical level rod 81 is actuated through a cylindrical sleeve 90 having an annular shoulder 91 which cooperates with the cover plate 62 to confine therebetween a return compression spring 92 which serves to maintain the upper extremity of the sleeve 90 in contact with the under surface of the pump link 73. The sleeve is provided at its lower end with an annular flange 93 which cooperates with a collar 94 on the rod 81 to confine therebetween a compression actuating spring 95.

As heretofore explained, the pump link 73 is reciprocable through the rotation of the pump drive shaft 63 and the consequent operation of the crank shaft 66, the drive crank 68, and the drive link 70. Reciprocation of the pump link will cause downward movement of the link 73 from its position illustrated in Figure 8, forcing the sleeve 90 downwardly and, through the medium of the spring 95, causing pivotal movement of the plate 85 about its pivot point 86 to insert the probe or finger 88 into the space between the guide rods 34 illustrated as occupied by the part A in Figure 8. If no part occupies the dotted position illustrated in Figure 8, then the probe may freely enter the space and free movement of the rod is accommodated. However, if a part does occupy the space, then pivoted movement of the plate 85 is restricted and vertical movement of the sleeve 90 will merely compress the spring 95 without causing entry of the probe 88 into the space. The spring 92 serves merely to return the sleeve 90 upon vertically upward movement of the pump link, thus insuring adequate following of pump link movement by the sleeve 90. The rod 81 extends vertically above the pump link (Figure 3) and the rod is provided at its upper end with an off-set terminal projection 96 which is adapted to contact the actuating arm 97 of a limit switch 98. The limit switch 98 is in circuit with the timer 99 having an indicating light 100. It will be appreciated that means other than the indicating light 100 may be utilized if desired.

If the space probed by the finger 88 is not occupied by a part A, vertical reciprocation of the rod 81 will occur to such an extent that limit switch 97 will be actuated and the timer 99 will receive a signal. If the space is occupied, the signal to the timer will not be given since the limit switch will not be actuated. The timer 99 is of the type which functions to time the interval between actuations of the limit switch and if upon the expiration of an interval, say on the order of 30 seconds, the limit switch has not been actuated, the light 100 will be energized to indicate to an operator at the machine that the storage and conveyor unit is full. Accordingly, the supply of parts to the storage and conveying unit may be stopped, or the preceding operation may be halted.

*Operation*

The operation of the mechanism as heretofore described will be readily apparent to those skilled in the art, but the following description of its operation is given somewhat greater detail.

The liquid tank container 21 is preferably filled with a liquid of appreciable viscosity having non-oxidizing characteristics. For example, a preferable liquid is water containing a rust inhibitor, a light oil, or the like composition.

The parts, such as hobbed gear blanks or the like to be stored in and conveyed through the mechanism are fragile, in the sense that any forcible contact between adjacent parts will cause nicking or other surface defects which become exaggerated during subsequent heat treating or the like to render the part unsuitable for use. The part preferably is introduced through the inlet defined by rods 34 (Figure 4) and are conveyed by gravity into the container to enter the liquid contained therein. The viscosity of the liquid will reduce the velocity of the part to a point at which the parts are conveyed through the spiral storage track solely by the liquid eddy currents induced therein because of rotation of the rotor 36, 37, aided by gravity. The parts are guided in the spiral track by the rods 34 and the guide elements 33 which are retained in properly spaced and spiral relation by the apertures 31 formed in the spaced plates 30. Rotation of the rotor paddles 37 will cause a gentle spiral movement of the parts along the track.

After the parts have traveled throughout the complete spiral path, each part, still immersed in the liquid, enters the outlet track illustrated in detail in Figure 1. The parts roll between the side legs 51 of the pump element 47 until a part rests upon the block 59 at the foot of the pump column 55. Vertical movement of the pump column as a whole will raise the part to such an extent that it is superimposed over the stop rod 52 joining the legs 51, the stop rod being moved to the left (Figure 1) against the tension of the spring 49 by the part and the rod springing backwardly because of tension of spring 49 to underlie the part and to hold the part, and any parts above the one part in the pump column, above the plate 59. In this manner, the pump column 55 is filled with a vertical column of parts each of which will be sequentially advanced and finally dispensed through the open upper end of the pump column.

The pump column communicates with a parts outlet conveyor indicated generally at 101 in Figure 1. Located along the length of this outlet conveyor is a stop pin illustrated in dotted outline as being insertable in the path of travel of parts along the conveyor. The stop pin is controlled by suitable means, as by a solenoid 103, which may be actuated by an operator to stop the flow of parts from the storage and conveying mechanism. Upon energization of the solenoid 103, the pin 102 is inserted into the conveyor 101. The column of parts issuing from the storage unit is thus stopped, but such a stoppage of parts is accommodated by the mechanism. The stopping of the flow of the parts, as by the pin 102, will halt the vertical movement of the pump column 55 since the strap 47 can pivot about pin 46 in only one direction and the column 55 will be held thereby in elevated position. Thus the over-ride spring 77 will merely torsionally deflect to accommodate relative movement between the drive link 70 and the pump link 73. The storage mechanism will not be damaged although continued operation of the actuating motor 40 and the remainder of the driving apparatus 44 will be accommodated.

The operation of the level control including the probing finger or projection 88 has been heretofore described, and it will be appreciated that this level control will prevent the filling of the container to such an extent that successive incoming parts may forcibly contact one another to such an extent as to cause damage to the parts.

While preferred embodiments have been described above in detail, it will be understood that numerous modifications might be resorted to without departing from the scope of our invention as defined in the following claims.

We claim:

1. An apparatus for the storage of fragile parts, comprising a tank adapted to contain a body of liquid, a spiral track adapted to be submerged in the liquid contained in said tank, means communicating with said track for introducing parts onto one end thereof, rotary means concentric with said track, means for driving said rotary means to circulate said body of liquid and to thereby advance said parts along said track, and means at the other end of said track for ejecting parts from said tank.

2. In a parts handling mechanism, means for confining a body of liquid, a substantially stationary spiral storage track immersed in the body, an inclined entrance track communicating with said storage track for conveying a part to the storage track, resistance of the liquid reducing the velocity of the part during the passage thereof along said storage track, and means including a reciprocating exit track for removing parts from said storage track and said body of liquid.

3. A method for insuring the gentle handling of fragile parts while accommodating the storage of a large number of parts in a limited space, comprising the steps of providing a spiral storage track submerged in a body of liquid, introducing parts onto said track at a substantial velocity, reducing the velocity of said parts appreciably by conveying the same along an appreciable length of the submerged track prior to abutment of the part with an adjacent part, and circulating the body of liquid in a direction to advance the parts along said track.

4. In a parts storage apparatus, a generally cylindrical tanks, means defining a spiral track extending peripherally of said tank, means for successively introducing parts onto said track, said tank adapted to contain a body of liquid within which said track is submerged, rotary pump means coaxial with said tank for circulating the body of liquid therein, the liquid circulation advancing the parts along said track, an exit track for receiving parts from said spiral track, means for reciprocating said exit track, and an escapement mechanism effecting the escape of successive parts onto said exit track to be dispensed thereby from said tank.

5. A handling system for fragile parts comprising a liquid-tight tank adapted to contain a body of liquid therein, a track in said container at least partially disposed beneath the level of liquid therein, means for introducing parts into said container for travel along said track, means for circulating said body of liquid to advance parts along said track, and means for ejecting parts from said track to the exterior of said container, said last means comprising an exit track adapted to receive parts from said elongated track, means for reciprocating said exit track, and spring-biased escapement means interposed between said tracks.

References Cited in the file of this patent
UNITED STATES PATENTS

| | | |
|---|---|---|
| 797,171 | Cerruti | Aug. 15, 1905 |
| 1,128,825 | Troehler | Feb. 16, 1915 |
| 1,280,731 | Herr | Oct. 8, 1918 |
| 2,092,938 | Stebler | Sept. 14, 1937 |
| 2,537,904 | McAllister | Jan. 9, 1951 |
| 2,617,435 | Kessler | Nov. 11, 1952 |
| 2,618,577 | Bash | Nov. 18, 1952 |
| 2,624,353 | Thom | Jan. 6, 1953 |
| 2,760,503 | Carrier | Aug. 28, 1956 |
| 2,775,974 | Coquyt | Jan. 1, 1957 |